UNITED STATES PATENT OFFICE 2,299,555

BENZENESULPHONAMIDE COMPOUNDS

Fritz Mietzsch and Karl Bauer, Wuppertal-Elberfeld, Germany, assignors to Winthrop Chemical Company, Inc., New York, N. Y., a corporation of New York No Drawing. Application August 27, 1940, Serial No. 354,396. In Germany August 9, 1939

10 Claims. (Cl. 260—296)

This invention relates to benzenesulphonamide compounds and to a process of preparing the same.

In accordance with the present invention new thereapeutically valuable products are obtainable by the manufacture of 2-methylbenzenesulphonamido-pyridines and -thiazoles containing in the 5-position of the benzene nucleus a nitrogenous group the nitrogen atom of which is attached to the benzene nucleus which nitrogenous group is selected from the group consisting of nitro, amino, acylamino, urethane, ureido and azomethine groups. The products accordingly have the general formula

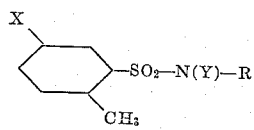

wherein X stands for the nitrogenous group the nitrogen atom of which is attached to the benzene ring, which nitrogenous group is selected from the group consisting of nitro, amino, acylamino, ureido, urethane and azomethine groups, Y stands for one of the substituents hydrogen, lower alkyl and phenyl, and R stands for a radical selected from the group consisting of thiazole and pyridine radicals.

The said new products have a superior therapeutic activity in the treatment of certain bacterial infections, particularly in the infections by bacterium Bang and pneumococci, when compared with the corresponding known compounds containing the nitrogenous group in the 4-position to the sulphonamide group. This discovery is most surprising; for, on account of the former experiences, there was the hypothesis that only those benzenemonosulphonamide compounds are useful as thereapeutics which contain the nitrogenous group in the 4-position to the sulphonamide group. The new compounds furthermore have the advantage that they can be prepared in a smooth reaction from readily available starting materials. Those products are preferred which contain as the nitrogenous group in the 5-position of the benzene nucleus an amino or acylamino group.

In accordance with the present invention the said new products are obtained by reacting a 2-methylbenzenesulphohalide, the 5-position of which is substituted by a nitrogenous group in the manner as specified above, upon a primary or secondary aminopyridine or aminothiazole. The said aminopyridine or aminothiazole may contain further substituents in the nucleus, such as alkyl and aryl, preferably phenyl groups, nitro groups, etc. Also in the amino group of the aminopyridine or aminothiazole, one hydrogen atom may be replaced by lower alkyl groups such as the methyl, ethyl, propyl, butyl and allyl group or by a phenyl radical.

The new products are furthermore obtainable by reacting a 2-methyl-benzenesulphonamide, the 5-position of which is substituted by a nitrogenous group as specified above and the sulphonamide group of which contains at least one hydrogen atom in the amino group, with a pyridine or a thiazole containing a reactive substituent such as halogen.

The said new benzenesulphonamide compounds can also be obtained by converting in a 2-methylbenzenesulphonamido-pyridine or -thiazole a substituent standing in the 5-position of the benzene ring and being convertible into a nitrogenous group of the kind specified above, into such a nitrogenous group by the methods known for this purpose; for instance, a carboxylic acid amide or -hydrazide or -hydroxylamide group may be degraded to the amino group according to the reactions known for this purpose. According to this process, also a nitrogenous group present in the 5-position of the compounds in question may be converted by the methods known per se into another nitrogenous group in order to convert the product into a still more effective product. For instance, nitro- or azo groups may be reduced to the amino groups. Acylamino or azomethine groups may be hydrolized to the amino group, or amino groups may be converted into acylamino groups by the action of acylating agents, or into an azomethine group by reaction with an aldehyde, or into a nitro group by diazotization and Sandmeyer's reaction.

The invention is furthermore illustrated by the following examples, without being restricted thereto:

Example 1

150 grams of 4-nitrotoluene-2-sulphochloride are added to a solution of 112 grams of 2-amino-4-phenylthiazole in 100 ccm. of pyridine while stirring. The mixture is heated after some time for about one hour on the waterbath and is sucked off after cooling. When using a greater excess of pyridine as solvent, the mixture advantageously is poured into dilute hydrochloric acid while stirring and the precipitate formed thereupon is sucked off. It is purified by dissolving in dilute sodium hydroxide solution and by precipitating with dilute acetic acid. When recrystallized from methylenechloride, the 2-(5'-nitro-2'-methyl-benzenesulphonamido)-4-phenylthiazole thus formed melts at 169–170° C.

200 grams of the nitro compound are heated to boiling with 350 grams of iron, 750 ccm. of water and 10 ccm. of glacial acetic acid for 4–5 hours while stirring. The reaction mixture is sucked off, the precipitate is comminuted and extracted with hot acetone. The acetone solution is concentrated to crystallization, the precipitate is dissolved in dilute sodium hydroxide solution, reprecipitated from the solution by acidifying with acetic acid and finally recrystallized from acetone. The 2-(5'-amino-2'-methyl-benzene-sulphoamido)-4-phenylthiazole melts at 226° C.

When using 2-amino-4-methylthiazole, the 2-(5'-nitro-2'-methyl-benzenesulphonamido)-4-methylthiazole melting at 226–227° C., and, by reducing the same, the 2-(5'-amino-2'-methyl-benzenesulphonamido)-4-methylthiazole melting at 238–239° C. are obtained; when using 2-phenylamino-4-methylthiazole, the 2-(5'-nitro-2'-methylbenzenesulphone-phenylamido)-4-methylthiazole melting at 144° C., and, by reducing the same, the 2-(5'-amino-2'-methyl-benzenesulphonephenylamido)-4-methylthiazole melting at 136–138° C. are obtained. The 2-[5'-nitro-(5'-amino resp.)-2'-methyl-benzenesulphonemethylamido]-4-methylthiazoles are obtained when using 2-methylamino-4-methylthiazole.

Example 2

100 grams of 4-nitrotoluene-2-sulphochloride are added to a solution of 40.5 grams of 2-aminopyridine in 100 ccm. of pyridine. The mixture is warmed for one hour in the waterbath after standing for one day at room temperature. After cooling the precipitate formed is sucked off, washed with pyridine, dissolved in sodium hydroxide solution and reprecipitated with ammoniumchloride solution. The 2-(5'-nitro-2'-methyl-benzenesulphonamido)-pyridine thus obtained melts after recrystallization from ethyleneglycol at 231–232° C.

120 grams of iron turnings, 400 ccm. of water and 5 ccm. of glacial acetic acid are heated for a short time. 80 grams of the nitro compound are gradually added thereto. The mixture is boiled for about 4 hours and then, after cooling, mixed with 75 ccm. of concentrated sodium hydroxide solution and stirred for some time at 35° C. The reaction mixture is sucked off and the filtrate is mixed with ammoniumchloride. The 2-(5'-amino-2'-methyl-benzenesulphonamido)-pyridine thus precipitated is recrystallized from 60% alcohol. It melts at 194–195° C. After repeated recrystallization from methanol the melting point rises to 205° C.

When using instead of 2-aminopyridine the same quantity of 4-aminopyridine, the 4-(5'-nitro-2'-methyl-benzenesulphonamido)-pyridine melting at 257–258° C. (from acetone), and, by reducing the same, the 4-(5'-amino-2'-methyl-benzenesulphonamido)-pyridine melting at 237–238° C. (from dilute acetone) are obtained.

Example 3

94 grams of α-aminopyridine are dissolved in 400 ccm. of pyridine. The solution is mixed slowly with 4-acetyltoluidine-2-sulphochloride (obtained by reacting chlorosulphonic acid upon 4-acetyltoluidine in the cold). After standing for some time, the mixture is heated for half an hour on the waterbath and then added to dilute cold hydrochloric acid while stirring. The precipitate of 2-(5'-acetylamino-2'-methyl-benzenesulphonamido)-pyridine thus obtained melts, when recrystallized from dilute acetone, at 256° C.

By boiling this acetyl compound for half an hour with 16% sodium hydroxide solution, precipitating by neutralization with acetic acid and recrystallizing from dilute acetone, the 2-(5'-amino-2'-methyl-benzenesulphonamido)-pyridine melting at 209° C. is obtained.

When using 2-aminothiazole, the 2-(5'-acetylamino-2'-methyl-benzenesulphonamido)-thiazole melting at 263° C. (from acetone) and, by saponifying the same, the 2-(5'-amino-2'-methyl-benzenesulphonamido)-thiazole melting at 185° C. (from dilute acetone) are obtained in the same manner.

Example 4

75 grams of 4-tolylurethane-2-sulphochloride (obtained by reacting chlorosulphonic acid upon p-methylphenylurethane in the cold) are added to a solution of 26 grams of 2-aminopyridine in 100 ccm. of pyridine. After heating for one hour on the waterbath, the mixture is poured into dilute cold hydrochloric acid while stirring. The precipitate is separated and recrystallized from dilute methylalcohol. The 2-(5'-carbethoxyamino-2'-methyl-benzenesulphonamido)-pyridine thus obtained melts at 251° C.

By saponification with diluted sodium hydroxide solution the 2-(5'-amino-2'-methyl-benzenesulphonamido)-pyridine described in Example 3 and melting at 209° C. is obtained.

The N-propionyl compound is obtained therefrom as follows: 40 grams of 2-(5'-amino-2'-methyl-benzenesulphonamido)-pyridine are dissolved in 250 ccm. of acetone and 27 grams of pyridine. The solution is mixed with 21 grams of propionylchloride. After heating for one hour to boiling the acetone is distilled off and the residue is poured into dilute hydrochloric acid. By dissolving the precipitate in dilute sodium hydroxide solution, reprecipitating with acetic acid and recrystallizing from dilute acetone, the 2-(5'-propionylamino-2'-methyl-benzenesulphonamido)-pyridine melting at 226° C. is obtained.

The N-p-methoxybenzylidene compound is obtained as follows:

30 grams of 2-(5'-amino-2'-methyl-benzenesulphonamido)-pyridine are heated with 100 ccm. of alcohol and 16 grams of 4-methoxy-benzaldehyde for 5 hours to boiling. The alcohol is evaporated. The residue is recrystallized from diluted methylalcohol. The 2-[5'-(4''-methoxybenzylideneamino)-2'-methyl-benzenesulphonamido]-pyridine thus obtained melts at 225° C.

The 2-(5'-ureido-2'-methyl-benzenesulphonamido)-pyridine is obtained by reacting 5-ureido-2-methyl-benzenesulphochloride with 2-aminopyridine in an analogous manner as indicated in paragraph 1 of this example.

Example 5

2.8 grams of 2-aminopyridine are dissolved in 20 ccm. of acetone. The solution is mixed with 5 grams of sodium bicarbonate. Then, a solution of 4'-nitrobenzyl-4-acetyltoluidine-2-sulphochloride is slowly added thereto while stirring. After standing for some time, the mixture is heated for one hour to boiling. Then it is sucked off while hot and the residue is extracted with hot acetone. The 2-[5'-(4''-nitrobenzyl-acetylamino)-2'-methyl-benzenesulphonamido]-pyridine melting at 266° C. crystallizes from the concentrated acetone solutions.

Example 6

40 grams of 2-chloro-5-nitropyridine are dissolved in 400 ccm. of nitrobenzene. After adding 80 grams of potassium carbonate, 1 gram of copper powder and 58 grams of 4-acetyltoluidine-2-sulphonamide, the mixture is heated during 6-8 hours to 160-180° C. while stirring. After blowing off the nitrobenzene with steam, the residue is filtrated and the filtrate is acidified with acetic acid. The precipitate of 2-(5'-acetylamino-2'-methyl-benzenesulphonamido)-5-nitropyridine melts, when recrystallized from acetone, at 234° C.

We claim:

1. A product of the formula

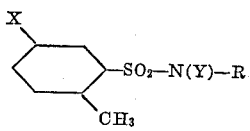

wherein X stands for a nitrogenous group the nitrogen atom of which is attached to the benzene ring, which nitrogenous group is selected from the group consisting of nitro, amino, acylamino, ureido, urethane and azomethine groups, Y stands for one of the substituents hydrogen, lower alkyl and phenyl, and R stands for a radical selected from the group consisting of thiazole and pyridine radicals, the N atom being linked to a carbon atom of said pyridine and thiazole ring respectively.

2. A product of the formula

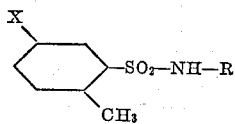

wherein X stands for a nitrogenous group the nitrogen atom of which is attached to the benzene ring, which nitrogenous group is selected from the group consisting of nitro, amino, acylamino, ureido, urethane and azomethine groups and R stands for a radical selected from the group consisting of thiazole and pyridine radicals, the N atom being linked to a carbon atom of said pyridine and thiazole ring respectively.

3. A product of the formula

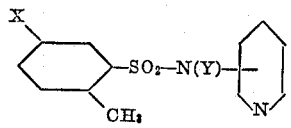

wherein X stands for a nitrogenous group the nitrogen atom of which is attached to the benzene ring, which nitrogenous group is selected from the group consisting of nitro, amino, acylamino, ureido, urethane and azomethine groups and Y stands for one of the substituents hydrogen, lower alkyl and phenyl.

4. A product of the formula

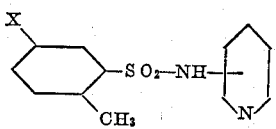

wherein X stands for a nitrogenous group the nitrogen atom of which is attached to the benzene ring, which nitrogenous group is selected from the group consisting of nitro, amino, acylamino, ureido, urethane and azomethine groups.

5. A product of the formula

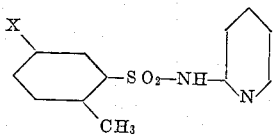

where in X stands for a nitrogenous group the nitrogen atom of which is attached to the benzene ring, which nitrogenous group is selected from the group consisting of nitro, amino, acylamino, ureido, urethane and azomethine groups.

6. A product of the formula

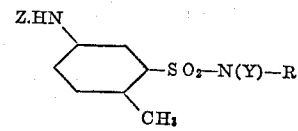

wherein Z stands for one of the substituents hydrogen and acyl, Y stands for one of the substituents hydrogen, lower alkyl and phenyl, and R stands for a radical selected from the group consisting of thiazole and pyridine radicals, the N atom being linked to a carbon atom of said pyridine and thiazole ring respectively.

7. A product of the formula

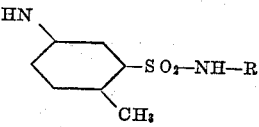

wherein Z stands for one of the substituents hydrogen and acyl and R stands for a radical selected from the group consisting of thiazole and pyridine radicals, the N atom being linked to a carbon atom of said pyridine and thiazole ring respectively.

8. A product of the formula

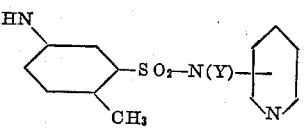

wherein Z stands for one of the substituents hydrogen and acyl and Y stands for one of the substituents hydrogen, lower alkyl and phenyl.

9. A product of the formula

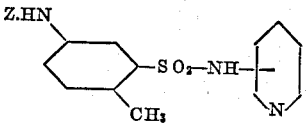

wherein Z stands for one of the substituents hydrogen and acyl.

10. A product of the formula

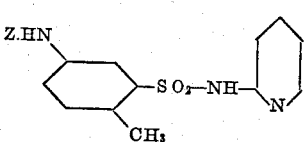

wherein Z stands for one of the substituents hydrogen and acyl.

FRITZ MIETZSCH.
KARL BAUER.